US00RE49491E

(19) United States
(12) Reissued Patent
Baghel et al.

(10) Patent Number: US RE49,491 E
(45) Date of Reissued Patent: Apr. 11, 2023

(54) METHOD AND SYSTEM FOR SELECTIVE PROTECTION OF DATA EXCHANGED BETWEEN USER EQUIPMENT AND NETWORK

(71) Applicant: Samsung Electronics Co., Ltd., Suwon-si (KR)

(72) Inventors: Sudhir Kumar Baghel, Suwon-si (KR); Anil Agiwal, Suwon-si (KR); Rajavelsamy Rajadurai, Bangalore (IN)

(73) Assignee: Samsung Electronics Co., Ltd., Suwon-si (KR)

(21) Appl. No.: 17/368,336

(22) Filed: Jul. 6, 2021

Related U.S. Patent Documents

Reissue of:
(64) Patent No.: 9,497,169
Issued: Nov. 15, 2016
Appl. No.: 14/406,506
PCT Filed: Jun. 10, 2013
PCT No.: PCT/KR2013/005060
§ 371 (c)(1),
(2) Date: Dec. 8, 2014
PCT Pub. No.: WO2013/183971
PCT Pub. Date: Dec. 12, 2013

U.S. Applications:
(63) Continuation of application No. 16/671,973, filed on Nov. 1, 2019, now Pat. No. Re. 48,631, which is an application for the reissue of Pat. No. 9,497,169.

(30) Foreign Application Priority Data

Jun. 8, 2012 (IN) ..... 2295/CHE/2012
Apr. 26, 2013 (IN) ..... 2295/CHE/2012

(51) Int. Cl.
*H04L 9/40* (2022.01)
*H04W 12/033* (2021.01)
(Continued)

(52) U.S. Cl.
CPC ..... *H04L 63/04* (2013.01); *H04L 63/0428* (2013.01); *H04L 63/20* (2013.01);
(Continued)

(58) Field of Classification Search
CPC ..... H04L 63/0428; H04L 63/04; H04W 52/0209; H04W 8/22; H04W 12/12; H04W 12/02; H04W 12/67; Y02D 30/70
See application file for complete search history.

(56) References Cited

U.S. PATENT DOCUMENTS 8,627,422 B2 * 1/2014 Hawkes ..... H04L 63/166 380/166
2005/0190911 A1 9/2005 Pare et al.
(Continued)

FOREIGN PATENT DOCUMENTS

GB 2518256 A * 3/2015 ..... G06F 13/1689

OTHER PUBLICATIONS

International Search Report dated Oct. 1, 2013 in connection with International Patent Application No. PCT/KR2013/005060, 3 pages.
(Continued)

*Primary Examiner* — Jalatee Worjloh
(74) *Attorney, Agent, or Firm* — Jefferson IP Law, LLP

(57) ABSTRACT

A method and system for providing selective protection of data exchanged between user equipment (UE) and network is disclosed. The selective protection is applied to a packet, a bearer or an access point name for secure exchange of data between the UE and the network. The network decides to apply selective protection based on configuration of network, configuration of UE, load in the network, battery power availability of UE, type of application running on UE. Further, the UE can request for selective protection based on the type of application running on UE and the battery level availability of the UE. The selective protection is either enabled or disabled dynamically by the network. Further,
(Continued)

various mechanisms for applying selective protection for each bearer, each packet and each Access Point Name (APN) are disclosed. Additionally, the method for identifying a secured and a non secured bearer has also been disclosed.

16 Claims, 12 Drawing Sheets

(51) Int. Cl.

| | |
|---|---|
| ***H04W 8/22*** | (2009.01) |
| ***H04W 12/02*** | (2009.01) |
| ***H04W 12/12*** | (2021.01) |
| ***H04W 52/02*** | (2009.01) |
| ***H04W 12/67*** | (2021.01) |

(52) U.S. Cl.
CPC ..... *H04W 8/22* (2013.01); *H04W 12/02* (2013.01); *H04W 12/033* (2021.01); *H04W 12/12* (2013.01); *H04W 52/0209* (2013.01); *H04W 12/67* (2021.01); *Y02D 30/70* (2020.08)

(56) References Cited

U.S. PATENT DOCUMENTS

2007/0171859 A1* 7/2007 Brahmbhatt ..... H04L 63/0492 370/328
2007/0234061 A1* 10/2007 Teo ..... G06F 21/566 713/178
2008/0307487 A1* 12/2008 Choyi ..... H04L 63/20 726/1
2009/0041246 A1* 2/2009 Kitazoe ..... H04W 12/02 380/270
2010/0054472 A1* 3/2010 Barany ..... H04L 63/0428 380/270
2011/0167470 A1* 7/2011 Walker ..... H04L 67/1095 726/1
2011/0188408 A1* 8/2011 Yi ..... H04W 12/10 370/254
2011/0271320 A1 11/2011 Andreasen
2012/0147834 A1 6/2012 Zisimopoulos et al.
2013/0097418 A1 4/2013 Bhatt et al.
2013/0157659 A1* 6/2013 Ikeda ..... H04W 12/08 455/435.1
2014/0126489 A1* 5/2014 Zakrzewski ..... H04W 28/26 370/329
2014/0157395 A1* 6/2014 Li ..... H04W 12/06 726/12
2014/0198637 A1 7/2014 Shan et al.

OTHER PUBLICATIONS

Written Opinion of International Searching Authority dated Oct. 1, 2013 in connection with International Patent Application No. PCT/KR2013/005060, 5 pages.
Marie Babel, et al., "Preserving Data Integrity of Encoded Medical Images: The LAR Compression Framework", Advances in Reasoning-Based Image Processing Intelligent Systems, 2012, 35 pages.

* cited by examiner

Fig. 2

| | | | | | |
|---|---|---|---|---|---|
| D/C | Sec Bit | R | R | PDCP SN | Octet 1 |
| PDCP SN (cont.) | | | | | Octet 2 |
| Data | | | | | Octet 3 |

| Sec Bit field Length: 1 bit | |
|---|---|
| Bit | Description |
| 0 | Protected PDU |
| 1 | Unprotected PDU |

New
FIG. 14
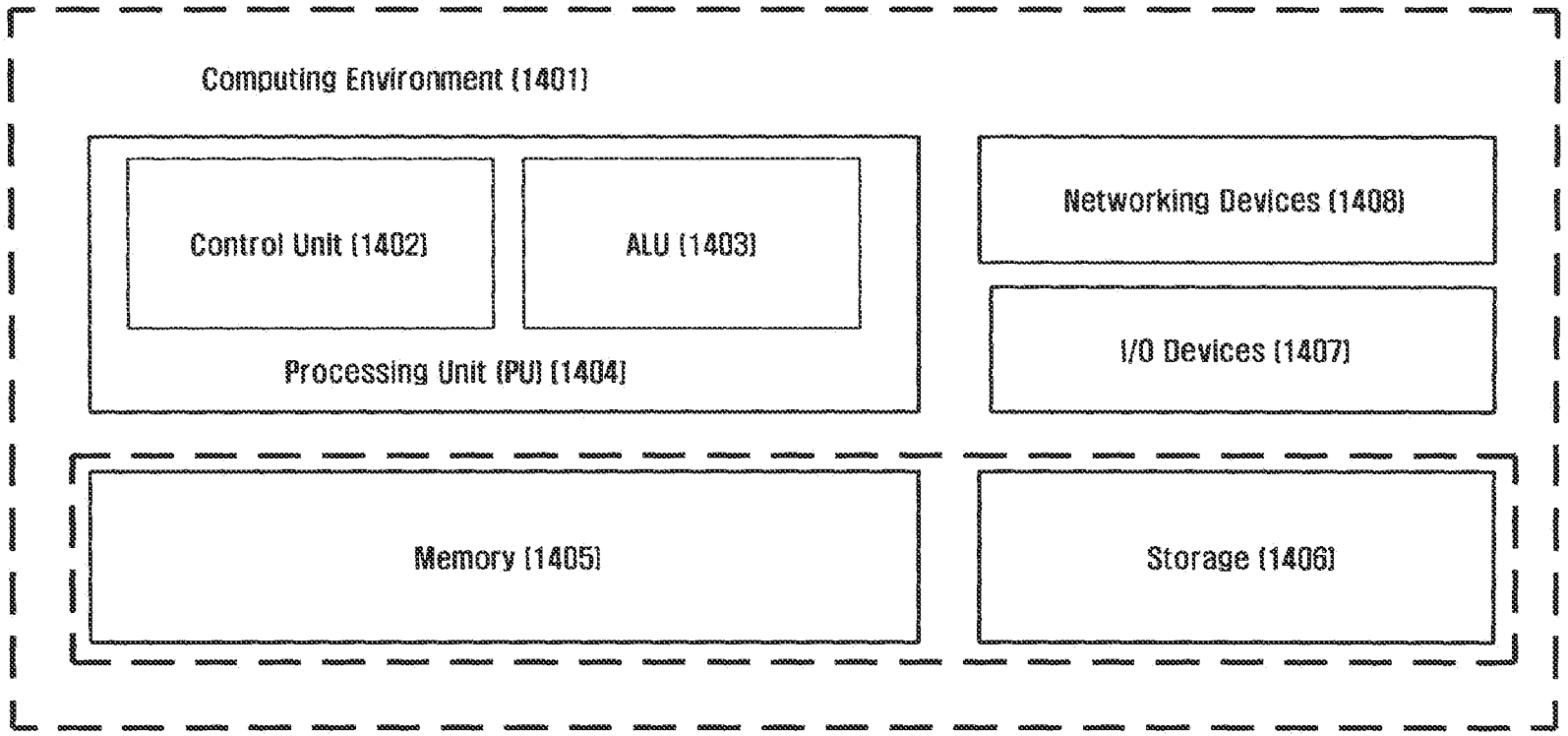

METHOD AND SYSTEM FOR SELECTIVE PROTECTION OF DATA EXCHANGED BETWEEN USER EQUIPMENT AND NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

*This application is a continuation reissue application of U.S. patent application Ser. No. 16/671,973, which has issued as U.S. Pat. No. RE48,631.*

The present application claims priority under 35 U.S.C. §365 to International Patent Application No. PCT/KR2013/005060 filed Jun. 10, 2013, entitled "METHOD AND SYSTEM FOR SELECTIVE PROTECTION OF DATA EXCHANGED BETWEEN USER EQUIPMENT AND NETWORK". International Patent Application No. PCT/KR2013/005060 claims priority under 35 U.S.C. §365 and/or 35 U.S.C. §119(a) to Indian Patent Application No. 2295/CHE/2012 filed Jun. 8, 2012, and Indian Patent Application No. 2295/CHE/2012 filed Apr. 26, 2013, which are incorporated herein by reference into the present disclosure as if fully set forth herein.

TECHNICAL FIELD

The present invention relates to protection mechanism in wireless networks and more specifically relates to method and system for selective protection of data, exchanged between user equipment (UE) and wireless network.

BACKGROUND ART

With the increasing popularity of mobile devices (for example smart phones), more users are utilizing their mobile devices to access different types of services over the Internet. For example, there is a trend towards allowing users to interact with banking services and/or networking sites using mobile devices. However, numerous security concerns arise when a user accesses the interne using a mobile device. In particular, some websites may include malware and/or spyware which may be configured to capture confidential and/or sensitive information/data stored on and/or entered through a mobile device.

A secure communications line is a communications line in between two access points to provide communication security. Further, an unsecure communications line is any line connecting the two access points without applying any communication security mechanisms.

In operation, a user may want to transmit or receive data of two different types (for example sensitive and non-sensitive data). If the user wants to transmit or receive non-sensitive data, it can be transmitted or received in an unsecure manner, meaning that an unintended recipient may have access to the data. For example, if the non-sensitive data is transmitted in an unencrypted form, an unintended recipient may access the data while being transmitted from the user to the intended recipient. It is possible, at user's request to send non-sensitive data in a secure form but is not necessary.

If a user is transmitting or receiving data that is sensitive it must be transmitted or received in a secure manner, meaning that an unintended recipient should not have access to the data. For example, if the sensitive data is transmitted in an encrypted form, an unintended recipient may access the encrypted data while being transmitted from the user to the intended recipient. However, in such a case, the unintended recipient may not be able to decrypt the encrypted data. All sensitive data that is transmitted in a secure manner is transmitted over secure transmission network.

In conventional wireless communication systems there is no way to differentiate between sensitive and non-sensitive data. Further, the data that is being transmitted is already encoded when it reaches the network, so the network has no way of distinguishing between data types. To achieve secure transmission of a user's sensitive data, all of the user's data must be treated as sensitive. In other words, a user may transmit all data in the secure manner over the secure network or the user may transmit all data in the unsecure manner over the unsecure network.

This method of on/off security is very inefficient due to the fact that the user may only be transmitting or receiving one type of data that is sensitive while the other types may be non-sensitive, or a set of users want to transmit/receive sensitive data as well as non-sensitive data while another set of users do not transmit or receive any sensitive data but only non-sensitive data. For example, if a user is transmitting or receiving sensitive voice data, non-sensitive text data, and non-sensitive internet data, the user will transmit or receive all three types of data through the secure network to ensure that the sensitive voice data will remain secure. As such, all three types will be treated as sensitive data and transmitted in the secure manner because networks lack ability to differentiate them and protect only the sensitive data.

At the same time, when the user uses smart phone for internet access, different applications may be running simultaneously and each application may require different security requirements. It may be important to secure the VoIP call and at the same time browsing a web page or downloading a video stream need not be secured. Further, applying security protection to each application running in the smart phone consumes battery power. Some applications (like bank transactions) require protection and some applications may not require the security protection.

However, in current method of transmitting or receiving data securely in a wireless communication system has limitation. There is no way to differentiate sensitive data from non-sensitive data and apply security for only selected data. In current communications networks there is no way to protect the data selectively like applying security for only sensitive data. This is very inefficient method of transmitting sensitive data.

Due to abovementioned reasons, it is evident that the existing system applies security to all the data irrespective of the fact that there is need to protect those data or not. Due to this, existing system fails to conserve the battery power by selective protection.

In the light of above discussion, it is desirable to have a method and system that provides a security mechanism for applying a dynamic switching on/off of the user plane protection based on user or network policy or application requirement.

DISCLOSURE OF INVENTION

Technical Problem

The principal object of the embodiments herein is to provide a method and system for providing selective protection of data exchanged between user equipment (UE) and a wireless network.

Another object of the invention is to provide a method and system for applying the selective protection to a particular user data traffic based on user configuration or network policy or type of application.

Another object of the invention is to provide a method and system for reducing battery power consumption of UE by applying the selective protection for user sensitive data or till some factors are satisfied, for example, the factors are type of application running on the UE, battery power availability of the UE, load in wireless network, configuration of the UE, configuration of the wireless network.

Solution to Problem

Accordingly the invention provides a method for selective protection of data, wherein the data is exchanged between user equipment (UE) and a wireless network, wherein the method comprises deciding to perform at least one of: enabling and disabling the selective protection dynamically by the wireless network during exchange of the data between the UE and wireless network for all user data traffic or for only particular user data traffic. Further the method comprises applying the selective protection to the data by at least one of: the wireless network and the UE based on at least one factor upon deciding by the wireless network.

Accordingly the invention provides a core network for selective protection of data, wherein the data is exchanged with user equipment (UE), wherein the core network is configured to decide for performing at least one of: enabling and disabling the selective protection dynamically during exchange of the data with the UE. Further the core network is configured to apply the selective protection to the data based on at least one factor upon deciding by the wireless network.

Accordingly the invention provides user equipment (UE) for selective protection of data, wherein the data is exchanged with a wireless network, wherein the UE comprises an integrated circuit. Further the integrated circuit comprises at least one processor, at least one memory. The memory comprises a computer program code within the circuit. At least one memory and the computer program code with the at least one processor cause the UE to send a request for at least one of: enabling and disabling the selective protection to the wireless network for the data based on at least one factor.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

Advantages, and salient features of the invention will become apparent to those skilled in the art from the following detailed description, which, taken in conjunction with the annexed drawings, discloses exemplary embodiments of the invention.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 2 illustrates a schematic diagram of adding a new secured bit field in the header of the PDCP PDU, according to the embodiments disclosed herein;

FIG. 14 illustrates a computing environment for implementing the method and system for enabling and disabling the selective protection by the wireless network, according to the embodiments as disclosed herein.

MODE FOR THE INVENTION

Figure 1:
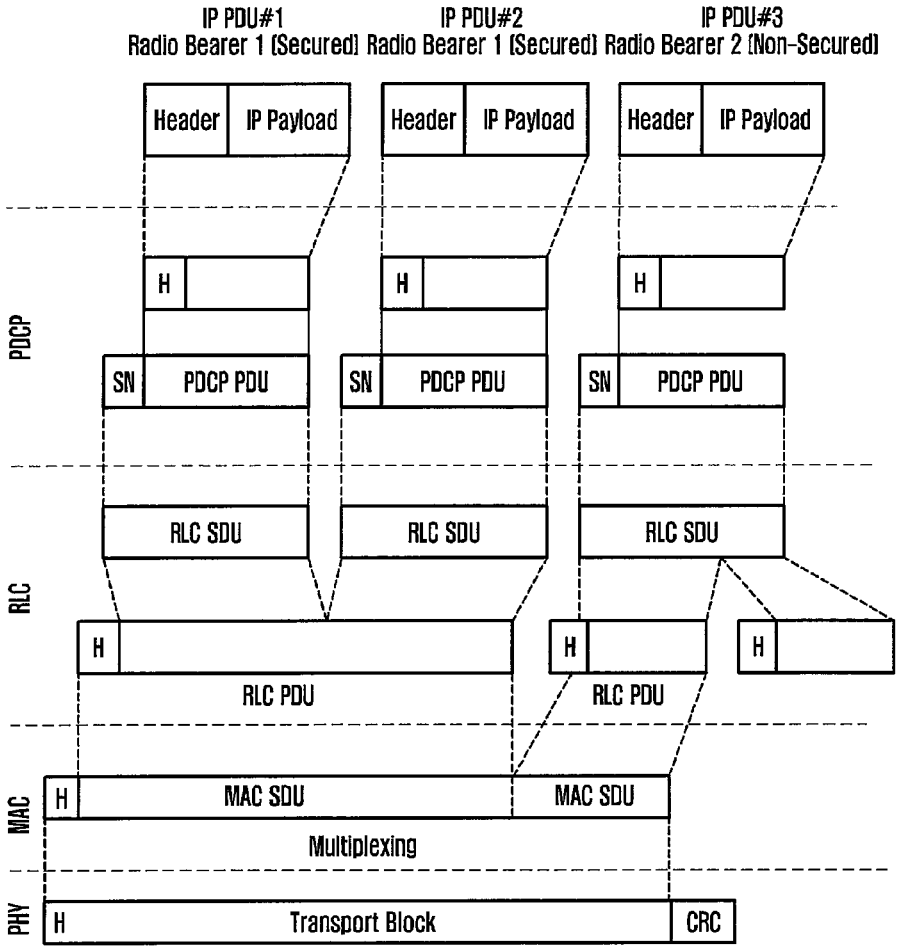
FIG. 1 illustrates an overview of LTE protocol stack for implementing the selective protection, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for dynamic switching ON/OFF of the user plane protection based on the one or more factors. In an embodiment, the factor can be type of application running on the UE, battery power availability of the UE, load in wireless network, and configuration of the UE, configuration of the wireless network or the like. The methods to achieve the selective protection in 3rd Generation Partnership Project (3GPP) networks are also disclosed. To apply selective protection, the method proposes two alternate mechanisms for 3GPP networks. One is per bearer (DRB-Data Radio Bearer) based approach and the second is per packet based approach.

The signaling plane messages are always protected as specified in the 3GPP specifications. The selective protection mechanism is only for the user plane traffic.

In per bearer DRB based approach, the method for applying the selective protection is based on two alternatives such as new indication associated with the bearer to indicate whether the bearer provides protection or not and another is new QCI values for selective protection treatment.

In the new QCI value based approach, the new QCI values along with the existing values are used to indicate whether the DRB needs to be protected or not to be protected. In an embodiment, protection means at least one of: encryption, ciphering, integrity protection.

Further, the selective protection of user plane data can also be achieved by using the combined DRB and per packet based approach. Based on the service request, the network and the UE establish the bearer for which the selective protection is enabled. In the selective protection bearer, per packet indication is used to indicate whether the data is protected or not.

In an embodiment, the UE can be a mobile phone, smart phone, tablet or any other electronic device which can access the services from a wireless network (for example internet and data services).

Referring now to the drawings, and more particularly to FIGS. 1 through 14, where similar reference characters denote corresponding features consistently throughout the figures, there are shown preferred embodiments.

FIG. 1 illustrates an overview of LTE protocol stack for implementing the selective protection, according to the embodiments as disclosed herein. As depicted in the figure, various layers namely Physical (PHY) layer, Medium Access Control (MAC) layer, Radio link Control (RLC) layer and a Packet Data Control Protocol (PDCP) layer exists in the protocol stack.

The physical (PHY) layer which is a first layer provides information transfer services to the upper layers using a physical channel. The PHY layer is connected to the upper Medium Access Control (MAC) layer through a transport channel, and data between the MAC layer and the PHY layer is transferred through the transport channel.

The Medium Access Control (MAC) layer in the protocol stack serves to map various logical channels to various transport channels, and also performs a logical channel multiplexing for mapping several logical channels to one transport channel. The MAC layer is connected to an upper RLC layer through a logical channel, and the logical channel is roughly divided into a control channel for transmitting control plane information and a traffic channel for transmitting user plane information according to the type of information to be transmitted.

Further, the RLC layer manages segmentation and concatenation of data received from an upper layer (PDCP layer) to appropriately adjust data size such that lower layer can send data to a radio section. Also, the RLC layer provides three operation modes such as a transparent mode (TM), an un-acknowledged mode (UM) and an acknowledged mode (AM) so as to guarantee various quality of services (QoS) required by each radio bearer (RB).

The PDCP layer of the second layer performs a header compression function for reducing the size of an IP packet header, which is relatively large in size and contains unnecessary control information to efficiently transmit IP packets (for example, IPv4 or IPv6) over a radio section with a relatively small bandwidth. Due to this, information only required from the header portion of data is transmitted, thereby serving to increase the transmission efficiency of the radio section. In addition, in the LTE system, the PDCP layer performs a security function, which includes ciphering and integrity protection.

The PDCP layer is upwardly connected to a Radio resource control (RRC) layer or user application, and downwardly connected to the RLC layer. The PDCP layer receives PDCP Service Data Units (SDUs) and stores the received PDCP SDUs in a transmission buffer. Then, the PDCP layer allocates a sequence number to each PDCP SDU.

If the established Radio Bearer (RB) is that of the user plane, i.e., DRB, then the PDCP layer performs header compression for the PDCP SDUs. Further, if the established RB is that of the control plane, then the PDCP layer performs integrity protection for the PDCP SDUs.

A data block generated by the result of the header compression is encrypted or ciphered. Further, the PDCP layer fixes a proper header to the ciphered data block to constitute PDCP PDU, and then transfers the constituted PDCP PDU to the RLC layer.

In general, if the PDCP SDU need to be protected and if there is no enough MTU (maximum transmission Unit) data, then SDU which does not need to be protected, are also protected for obtaining efficiency. For example, if the PDCP SDU-1 of DRB1 of high priority needs to be protected and has length less than MTU and another PDCP SDU-2 of DRB1 which is low priority which need not to be protected, then the PDCP layer also protects the PDCP SDU-2 and processes along with PDCP SDU-1, as PDCP SDU-1 need to be processed quickly.

FIG. 2 illustrates a schematic diagram of adding a new Sec bit field in the header of the PDCP PDU, according to the embodiments disclosed herein. As depicted in the figure, the PDCP PDUs for user plane comprises a (Data/Control) D/C field to distinguish the data PDUs from control PDUs. Further, the PDCP Data PDUs for user plane data comprises either an uncompressed or a compressed IP packet. The data PDU and control PDU are differentiated using the bit of length one, which can be either 0 or 1.

In the FIG. 2, 'R' denotes a reserved bit of length one. The reserved bit in the PDCP header is used to indicate whether the protection is applied or not. FIG. 2 illustrates one of the a' bits used as, the Sec bit field. The Sec bit field is used for differentiating the protected PDU from unprotected PDU. In this example, a protected PDU is denoted using a bit indication as zero and an unprotected PDU is denoted using a bit indication as one. In another embodiment, a new header field in addition to the existing fields is introduced to indicate whether the protection is applied or not.

The PDCP SN of the PDCP header represents a sequence number (SN). The PDCP SN can have the length of 5, 7 or 12 bits.

The data field may include either of uncompressed PDCP SDU (which comprises the user plane data or a control plane data) or compressed PDCP SDU (user plane data only).

Figure 3:
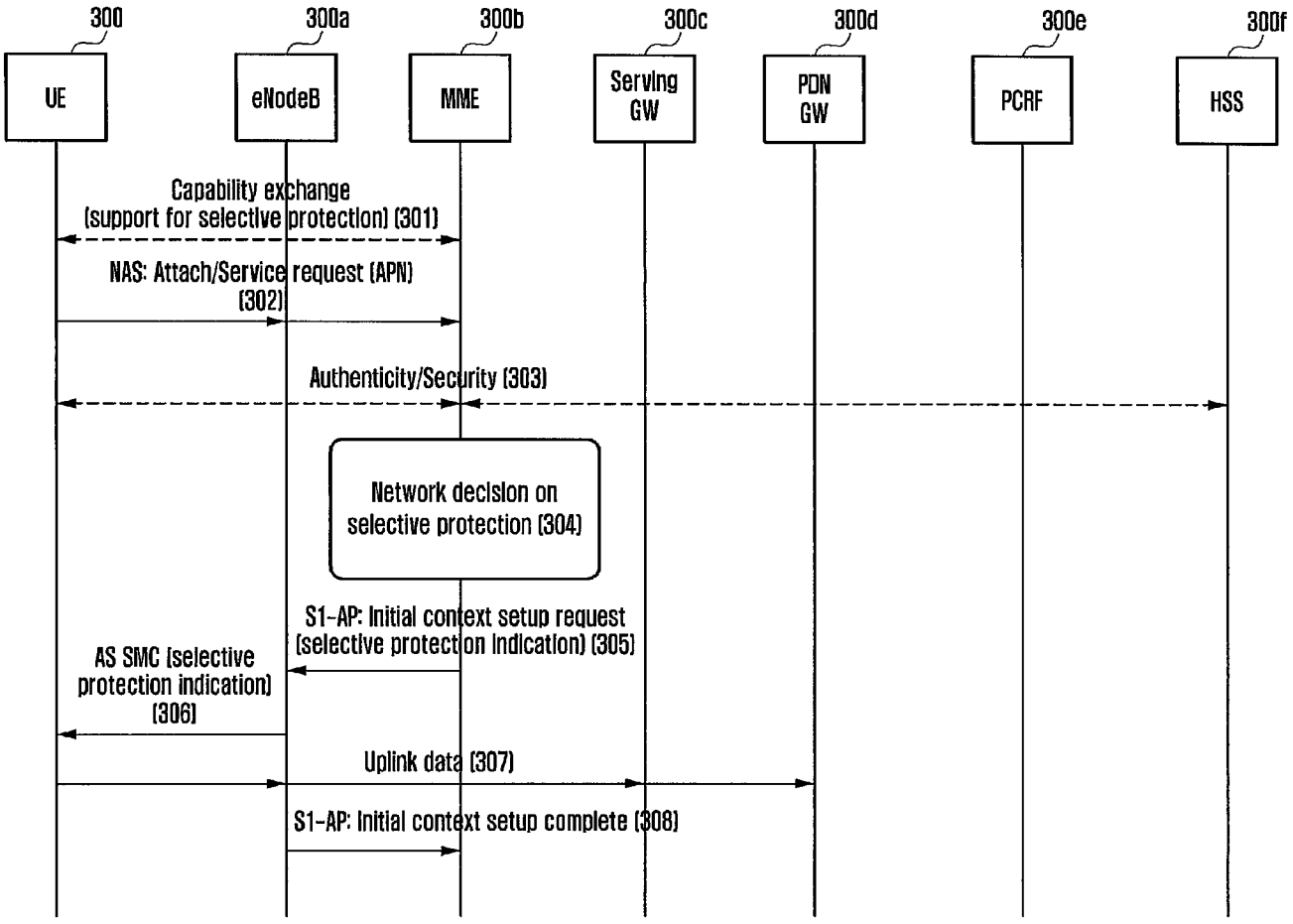
FIG. 3 illustrates a sequence diagram in which user equipment (UE) requests the wireless network to apply selective protection, according to the embodiments as disclosed herein.

FIG. 3 illustrates the sequence diagram in which user equipment (UE) requests the wireless network to apply selective protection, according to the embodiments as disclosed herein. The figure depicts UE 300, eNodeB 300a, MME 300b, Serving Gateway (SGW) 300c, PDN (Packet Data Network) Gateway (PDN GW) 300d, Policy Charging Rules Function (PCRF) 300e and Home Subscription Server (HSS) 300f.

As depicted in the sequence diagram, the UE 300 and the eNodeB 300a exchanges (301) the capability to support for selective protection during the initial attach procedure.

In an embodiment, the selective protection capability is exchanged along with the UE's 300 capability Non Access Stratum (NAS) message Information Element (IE).

In an embodiment, the UE 300 initiates the attach procedure by transmitting an attach request to the eNodeB 300a, wherein attach/service request comprises the International Mobile Subscriber Identity (IMSI), UE core network capability, UE specific DRX parameters, attach type and the like.

The UE 300 needs to register with the network to receive services which require registration. This registration is termed as Network Attachment. The always-on IP connectivity for UE 300 of the Evolved Packet System (EPS) is enabled by establishing a default EPS bearer during the Network Attachment.

The policy and charging control (PCC) rules applied to the default EPS bearer may be predefined in the PDN GW 300d and activated in the attachment by the PDN GW 300d itself. The attach procedure may trigger one or multiple Dedicated Bearer Establishment procedures to establish dedicated EPS bearer(s) for UE 300.

During the attach procedure, the UE 300 may request for an IP address allocation. Terminals utilizing only Internet Engineering Task Force (IETF) based mechanisms for IP address allocation are also supported.

The UE 300 sends (302) attach or service request message (L3 message) with the access point name (APN) to the MME 300b through eNodeB 300a. In an embodiment, the APN can be a default APN.

In an embodiment, the UE 300 may optionally indicate whether the protection is required for the service or not in attach or service request message (L3 message).

The MME 300b receives the L3 message and checks (303) for the validity of the available security context. If the available security context is not valid, then the MME 300b initiates an authentication procedure with the HSS 300f and establishes the security context.

Further, the MME 300b checks whether the UE 300 is capable of supporting the selective protection mechanism. During the initial attach procedure, the IMSI is obtained from the UE 300 and this IMSI is used for determining whether the UE 300 is capable of supporting the selective protection mechanism.

If the UE 300 supports the selective protection mechanism then the MME 300b checks whether the Access Point Name (APN) needs to be protected or not based on the factors like network configuration, UE subscription, UE configuration, request from the UE 300, user preference and decides (304) for selective protection mechanism which can be a per bearer (DRB) based protection, per packet based protection or combined per packet, per bearer based protection.

Further, the MME 300b indicates (305) the selective protection mechanism to the eNodeB 300a in the initial context setup request. Once the MME 300b indicates the eNodeB 300a, then the eNodeB 300a establishes the bearer and implements (306) the selective protection mechanism with the UE 300. In an embodiment, the MME 300b indicates the selective protection mechanism to the UE 300 in the L3 response message. For example, the L3 response message can be attach accept message, service accept message.

In an embodiment, selective protection indication is provided to the UE 300 in an Access Stratum (AS) Security mode command AS SMC procedure. In another embodiment, selective protection indication is provided to the UE 300 in a Non Access Stratum (NAS) Security mode command NAS SMC procedure.

The AS SMC procedure comprises a round trip of messages between eNodeB 300a and UE 300. The eNodeB 300a sends the AS security mode command to the UE 300 and the UE 300 replies with the AS security mode complete message. The AS security mode command message from eNodeB 300a to UE 300 may contain the selected AS algorithms.

In an embodiment, the SMC configured for selective protection is activated in the UE 300, by the access network 400 initiating intra eNodeB 300a handover procedures.

In another embodiment, the access network 400 initiates the intra eNB 300a handover procedure and then AS SMC to activate the new selective protection.

The method of providing selective protection of the data exchanged to the UE 300 by the wireless network.

In an embodiment, the selective protection is achieved by applying protection to each bearer between the UE 300 and the eNodeB 300a using the bearer based approach.

In another embodiment, the selective protection can also be provided to each packet in the packet based approach.

In another embodiment, the selective protection can also be applied for each packet associated with each bearer in the combined bearer and packet based approach.

The method for achieving the selective protection using per bearer based approach is as detailed herein. In this method, an indication is provided to the bearer, which indicates whether the bearer is protected or not. For supporting multiple security requirements, different bearers are setup between the UE 300 and the eNodeB 300a, each bearer is associated with different security mechanism.

In an embodiment, each bearer between the UE 300 and the eNodeB 300a is associated with an indication, which is decided by the eNodeB 300a during the bearer establishment or modification procedure. The indication associated with each bearer indicates whether the bearer is protected or not.

For illustration, the secured bearer or protected bearer is used for applications such as Voice Over Internet Protocol (VoIP), Hypertext Transfer Protocol Secure (HTTPS), Secure Socket Layer (SSL) sessions. These secured bearers have an indication for which the dedicated secured transmission is provided.

For illustration, the non-secured bearer does not provide protection and it is used for applications such as web browsing or video streaming or Real Time Gaming.

In an embodiment, the eNodeB 300a in the access network provides and ensures the configuration for protection of the bearer over the radio interface.

In an embodiment, each bearer between the eNodeB 300a and the UE 300 is associated with a QoS class identifier (QCI), secured or non-secured indication, and an allocation and retention priority (ARP).

In another embodiment of providing selective protection using per bearer based approach includes the usage of new QCI values. The new QCI values are configured in the core network and in the UE 300, to identify whether the bearer is protected or not.

In an embodiment, the bearer having the new QCI value is not protected by the eNodeB 300a during the data exchanged with the UE 300.

The new QCI values along with the existing QCI values are listed in the table below. Further, the new QCI values along with the existing values are used to indicate whether the service flow needs to be protected or not to be protected. In an embodiment, the protection implies at-least one of: encryption, ciphering, integrity protection.

In order to provide different bearer-level QoS along with security protection, a separate EPS bearer may be established for each QoS flow with security requirement. The user IP packets must then be filtered into the appropriate EPS bearers based on QoS and security requirements. In an embodiment, the decision whether to protect or not to protect the PDN connection can be taken by the PCRF 300e based on the operator policy. This means that, the PCC contains the security related information for the service data flow.

The PCRF 300e assigns the QCI value which includes the security requirements based on PCC rule defined. When the eNodeB 300a receives the QCI value, it determines whether the service flow needs to be protected or not to be protected.

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 10 (Non-Secured) | | 4 | 150 ms | $10^{-3}$ | Conversational Video (Live Streaming) |
| 3 | | 3 | 50 ms | $10^{-3}$ | Real Time Gaming |
| 11 (Non-Secured) | | 3 | 50 ms | $10^{-3}$ | Real Time Gaming |
| 4 | | 5 | 300 ms | $10^{-6}$ | Non-Conversational Video (Buffered Streaming) |
| 12 (Non-Secured) | | 5 | 300 ms | $10^{-6}$ | Non-Conversational Video (Buffered Streaming) |
| 5 | Non-GBR | 1 | 100 ms | $10^{-6}$ | IMS Signalling |
| 6 | | 6 | 300 ms | $10^{-6}$ | Video (Buffered Streaming) TCP-based (e.g., www, e-mail, chat, ftp, p2p file sharing, progressive video, etc.) |
| 13 (Non-Secured) | | 6 | 300 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice, Video (Live Streaming) Interactive Gaming |
| 14 (Non-Secured) | | 7 | 100 ms | $10^{-3}$ | Voice, Video (Live Streaming) Interactive Gaming |
| 8 | | 8 | 300 ms | $10^{-6}$ | Video (Buffered Streaming) TCP-based (e.g., www, e-mail, chat, ftp, p2p file sharing, progressive video, etc.) |
| 9 | | 9 | | | |

When the eNodeB 300a receives the QCI value, the eNodeB 300a identifies whether the service flow needs to be protected or not to be protected.

The method of providing selective protection to each packet during data exchanged between UE 300 and eNodeB 300a is detailed herein. An indication is provided in the user plane packet, which indicates whether the packet is protected or unprotected. This indication always indicates the receiving device of the packet for handling the packet. This ensures that not all the PDCP PDUs carried in a bearer are protected. The reserved bit 'R' or a new header field in the PDCP header is used to indicate whether protection is applied or not.

When the PDCP SDU is received at the PDCP layer, the upper layers may provide an indication to the PDCP layer whether protection should be applied on the PDCP SDU, accordingly the PDCP layer can set the indication field to 1 when protection is applied on a specific PDCP PDU as described in FIG. 2.

In an embodiment, protection is applied only at a regular interval or at random interval in statistical manner. This is achieved by the network (can be MME 300b) configures the UE 300 and the eNodeB 300a to protect every nth packet (for example n=5), and the UE 300 and the eNodeB 300a ciphers/deciphers packet with PDCP COUNT mod 5=0.

The value of the n can be pre-configured or dynamically configured during the attach procedure (for example SMC procedure) or in between Packet Data Protocol (PDP) connection in the UE 300 and in the eNodeB 300a. The value of the n can be unique to the UE 300 (can be based on subscription or based on batter power available at the UE 300) or can be in general for all the UEs in the network based on operator policy for overload control. Alternative to protect the nth packet, the network (can be eNodeB 300a) signals hash function to produce the sequence of PDCP COUNT, then UE 300 and eNodeB 300a cipher/decipher only those with the PDCP COUNT from the hash function. The rate at which the packet protection to be protected can be on-demand approach, where UE 300 request eNodeB 300a to decrease or increase the ratio of protected PDCP PDUs for the DRB, when the UE 300 is in processing limited state because of extremely high data rate. As an alternative to the PDCP COUNT, PDCP Sequence number (SN) or Hyper Frame Number (HFN) is used for selective protection in statistical manner. In an embodiment, the indication in the PDCP header is not present for selective protection in statistical manner.

In another embodiment, the selective protection can also be applied for each packet associated with each bearer in the combined bearer and packet based approach as described herein. In this method, the eNodeB 300a and the UE 300 establishes a bearer for which selective protection is enabled. In this bearer, a selective packet protection is applied for the packets that are associated with the bearer. An indication is provided to each packet for indicating whether the data is protected or not. Further, the selective protection mechanism of per bearer based per packet indication is provided to the applications that carry both sensitive and non-sensitive data in high volumes.

In an embodiment, the combined mechanism of per bearer based per packet indication is used when the new service requiring protection is mapped to the existing bearer. Further, the selective protection mechanism can also be applied based on the packet size and/or based on the protocol (application protocol (HTTP, HTTPS, RTP), transport layer protocol (UDP, TCP) and the like) used as described in FIGS. 10 through 13.

Once the AS SMC is enabled, the eNodeB 300a applies the selective protection (307) to all the downlink data traffic to the UE 300. Further, when the selective protection is enabled for the UE 300, the eNodeB 300a confirms (308) the applied selective protection with the MME 300b by including the applied selective protection information in a context setup complete request to the MME 300b in S1-AP interface.

Figure 4:
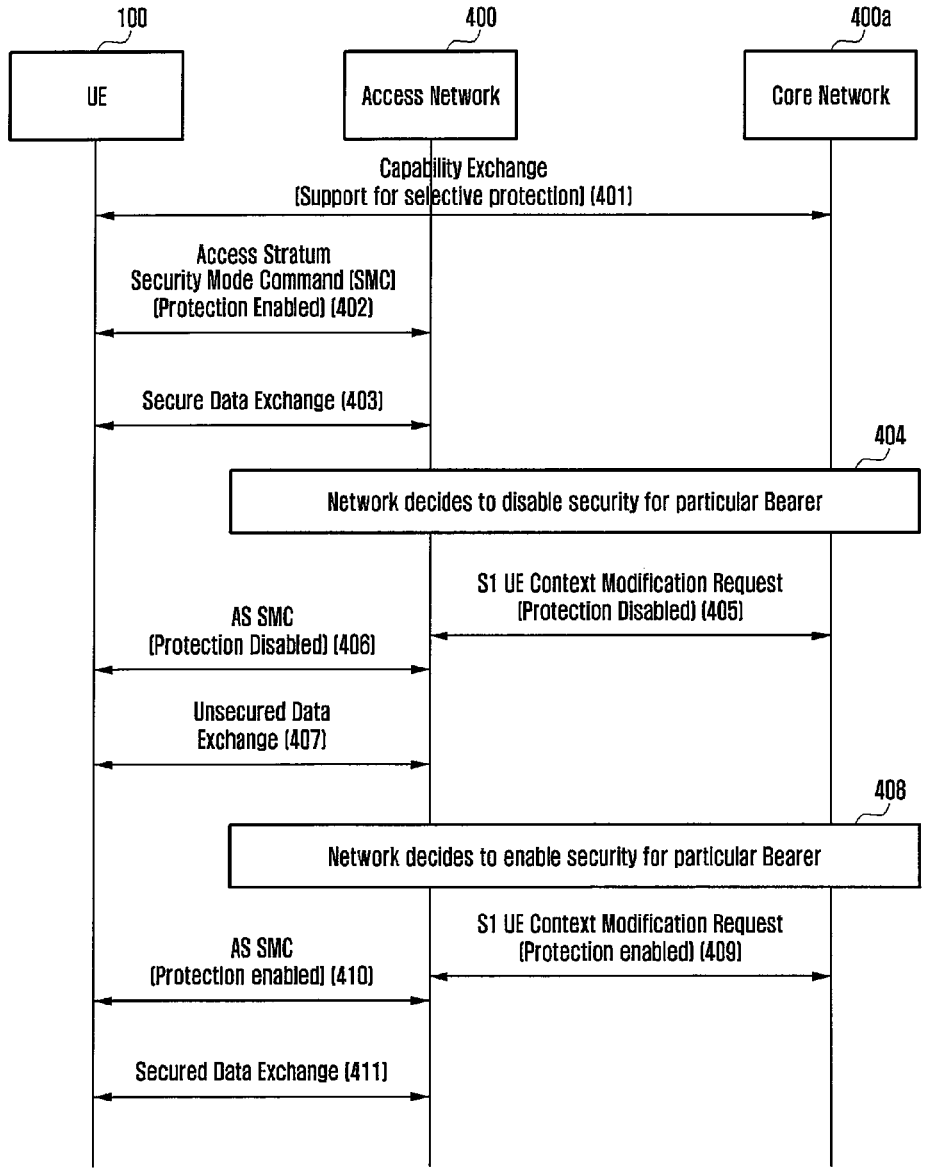
FIG. 4 illustrates the sequence diagram in which the core network decides to apply selective protection to each bearer, according to embodiments as disclosed herein.

FIG. 4 illustrates a sequence diagram in which the core network decides to apply selective protection to each bearer, according to embodiments as disclosed herein. The FIG. 4 depicts UE 300, Access Network (AN) 400 and Core Network (CN) 400a. As depicted in the sequence diagram, the UE 300 and the eNodeB 300a exchanges (401) the capability to support for selective protection during the initial attach procedure.

In an embodiment, the selective protection capability is exchanged along with UEs capability in the NAS message IE.

The UE 300 initiates the attach procedure by transmitting an attach request to the eNodeB 300a, wherein attach request comprises the IMSI, UE core network capability, UE specific DRX parameters, attach type and the like. Further, the UE 300 sends attach or service request message (L3 message) with the APN to the core network 400a through the access network 400.

The core network 400a receives the L3 message and checks for the validity of the available security context. If the available security context is not valid, then the core network 400a initiates an authentication procedure with the HSS 300f and establishes the security context. Further, the core network 400a enables the encryption for the user plane data based on the operator policy through the SMC and S1-initial context setup procedure.

Further, the access network 400 and UE 300 exchange (402) AS SMC protection enabled message. The access network 400 provides (403) secured data exchange to the UE 300. If the core network 400a decides for applying selective protection to the bearer using the QCI values, then the core network 400a assigns an appropriate QCI value for indicating whether the protection is applied to the PDN connection.

During the secured data exchange between the UE 300 and the AN 400, the core network 400a, at anytime decides (404) to disable security for a particular bearer. The decision for enabling or disabling the selective protection for a particular bearer is based on operator policy and may be based on the type of application and/or Traffic category and/or load in the core network. For example, the type of application can be APN based.

In an embodiment, the decision on the selective protect can also be made in the AN 400 based on the policy of the core network 400a or based on the network conditions like load in the AN 400.

When the core network 400a decides for disabling security, then the core network 400a sends (405) an S1 context modification request which include a protection disabled indication to the access network 400. Once the access network 400 receives the protection disabled indication from the core network, then the access network and the UE 300 exchange (406) AS SMC which includes the protection disabled indication.

In an embodiment, after receiving the S1-AP message to disable the security for a particular bearer, the AN 400 initiates the RRC procedure to disable the security for a particular bearer. In an embodiment, the S1-AP message can be at-least one of: S1-AP: UE Context modification request, S1-AP: E-RAB Modify Request message.

In an embodiment, the RRC procedure can be at least one of: AS SMC procedure, RRC Connection reconfiguration, RRC: Radio Modify Setup procedure.

In an embodiment, the core network 400 change the QCI or to switch the protection for per packet protection. In an embodiment, the S1-AP and RRC procedure includes at least one of: the Radio bearer ID, QCI, indication for security requirement to switch between protected or not protected operation.

When the protection is disabled, an unsecured data exchange happens (407) between the UE 300 and the access network 400.

Further, during the unsecured data exchange between the UE 300 and the access network 400, the core network 400a, at any time decides (408) to enable security protection to the bearer. The decision to enable or to disable protection on a particular bearer is based on operator policy and may be based on the type of application and/or traffic category and/or load on the network. The decision on the selective protect can be made in the AN 400 also based on the operator policy.

When the core network 400a decides for enabling security, then the core network 400a sends (409) an S1 context modification request which include a protection enabled indication to the access network 400. Once the access network 400 receives the protection enabled indication from the core network 400a, then the UE 300 and the access network 400 exchanges (410) AS SMC which includes the protection enabled indication.

In an embodiment, the core network 400a initiates S1-AP message (for example, S1-AP: UE Context Modification Request or S1-AP: E-RAB Modify Request) to the AN 400 and request AN 400 to enable protection for a particular bearer. The S1-AP: UE Context Modification Request or S1-AP: E-RAB Modify Request can include at least one of: the E-RAB ID, QCI, information on selective protection in statistical manner for which the security needs to be enabled.

In an embodiment, after receiving the S1 UE Context Modification Request or S1-AP: E-RAB Modify Request, the AN 400 initiates at least one of: the AS SMC procedure, RRC Connection reconfiguration, RRC: Radio Modify Setup to enable the security for a particular bearer or change the QCI or to switch the protection for per packet protection to enable the security.

Once the security protection is enabled, UE 300 and the access network 400 starts (411) a secured uplink data exchange with protection for that particular bearer.

Figure 5:
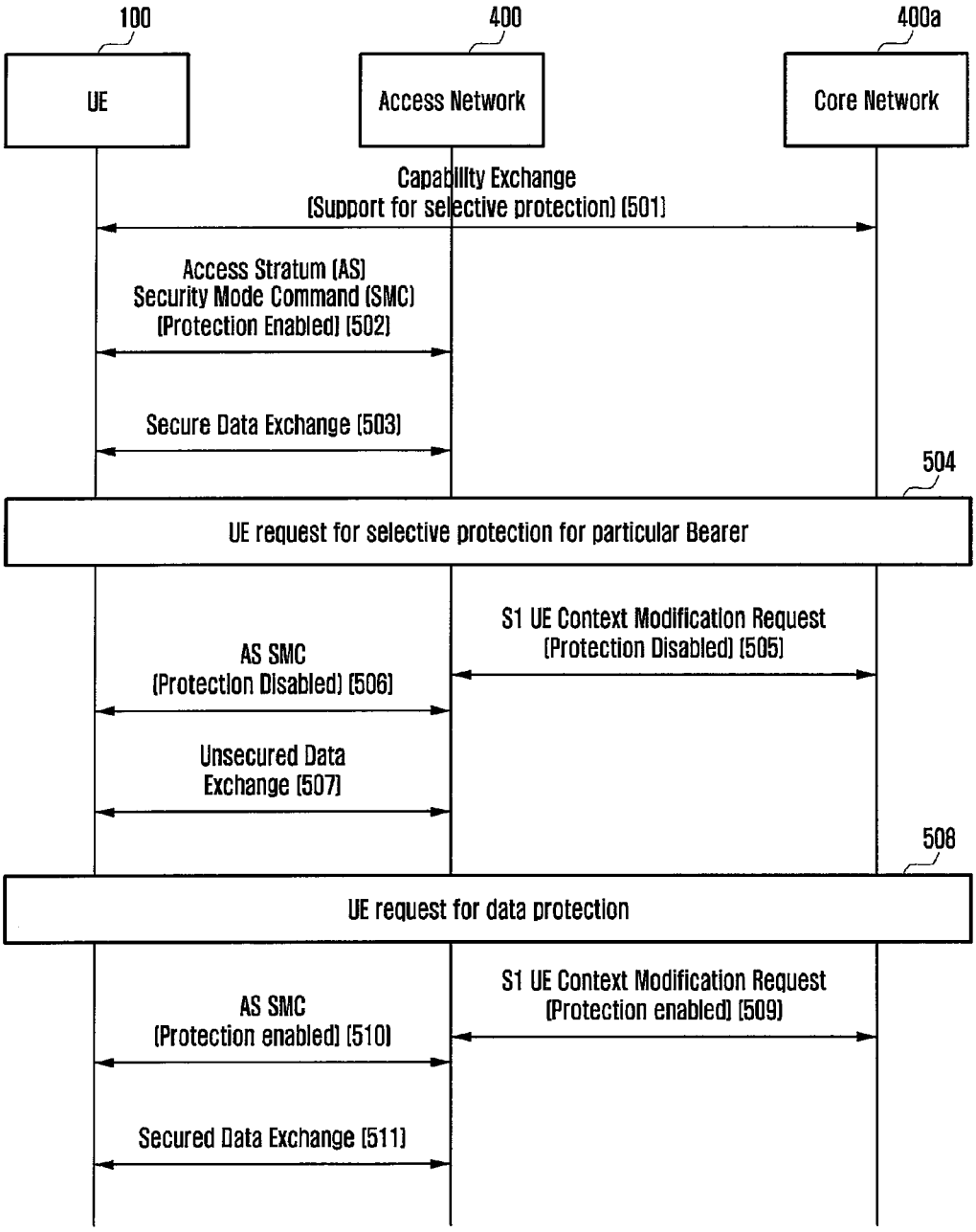
FIG. 5 illustrates the sequence diagram in which the UE request the core network to apply selective protection for each bearer, according to the embodiments as disclosed herein.

FIG. 5 illustrates the sequence diagram in which the UE requests the core network to apply selective protection for each bearer, according to the embodiments as disclosed herein. Initially, the UE 300 and core network 400a exchanges (501) a capability to support selective protection during initial attach procedure.

In an embodiment, the selection protection capability is exchanged along with UE 300 capability NAS message IE.

Then the UE 300 sends attach/service request message with APN or for default APN to the MME 300b through the eNodeB 300a. Then the core network 400a retrieves the security context. If the context is not available, then the core network 400a initiates the authentication procedure. After successful authentication or context retrieval, the core network 400a enables the encryption for the user plane data based on the operator policy through the SMC and S1 (Initial Context Setup) procedure. Then the UE 300 and access network 400 exchanges (502) AS SMC procedure. Further, after SMC procedure, the UE 300 and the access network 400 exchanges (503) secured data user plane traffic. During the data exchange, the UE 300 requests (504) selective protection for particular bearer (to disable the protection) to the core network 400a. Then the core network 400a initiates (505) S1 UE 300 context modification request to the access network 400 and requests access network 400 to disable protection for a particular bearer.

In an embodiment, the S1 UE 300 context modification request includes but not limited to S1-U TEID (S1-U Tunnel End Point Identifier) and/or EPS bearer ID and/or protocol for which the security needs to be disabled.

After receiving the S1 UE 300 context modification request, the access network 400 initiates (506) the AS SMC procedure to disable the security for a particular bearer requested by the UE 300.

In an embodiment, the SMC exchange includes but not limited to the Radio bearer ID. In an embodiment, along with the bearer ID, the network includes the information related to per packet protection (for example, information for statistical manner protection, protocol based protection). So, the UE 300 and the eNB 300a applies the per packet selective protection for the selected bearer ID. Also, the eNB 300a identifies the RAB-ID, to disable the security using the S1-U TEID or EPS bearer ID.

Then the UE 300 and the access network 400 starts (507) uplink data exchange without any protection for that particular bearer. During the data exchange, the UE 300 decides to request (508) selective protection for a particular bearer (to enable the protection).

In an embodiment, the UE 300 decides to request enable or to disable protection on the particular bearer based on operator policy, user configuration, type of application, traffic category battery power availability in the UE 300.

In an embodiment, the UE 300 requests for selective protection using a new NAS message or using existing NAS message.

Then the core network 400a initiates (509) the S1-AP message to the access network 400 and request access network 400 to enable protection for the particular bearer.

In an embodiment, the S1-AP includes but not limited to the S1-U TEID and/or EPS bearer ID for which the security needs to be enabled.

In an embodiment, the eNB 300a identifies the RAB-ID, to enable the security using the S1-U TEID and/or EPS bearer ID.

After receiving the S1 UE 300 context modification request from the core network 400a, the access network 400 initiates (510) the AS SMC procedure to enable the security for the particular bearer. The SMC exchange includes the bearer ID. In an embodiment, along with the bearer ID, the network includes the information related to per packet protection in statistical manner. So, the UE 300 and the eNB 300a applies the per packet selective protection for the selected bearer ID in statistical manner.

Then the UE 300 and access network 400 starts (511) the uplink data exchange with protection for that particular bearer. To enforce the selective protection, eNB might initiate the Intra eNB HO procedure or Key change on the fly procedure. In an embodiment, the un-protection or disabling of security is achieved by selecting NULL algorithm. In another embodiment, the un-protection or disabling of security is achieved by not performing any security mechanism.

Figure 6:
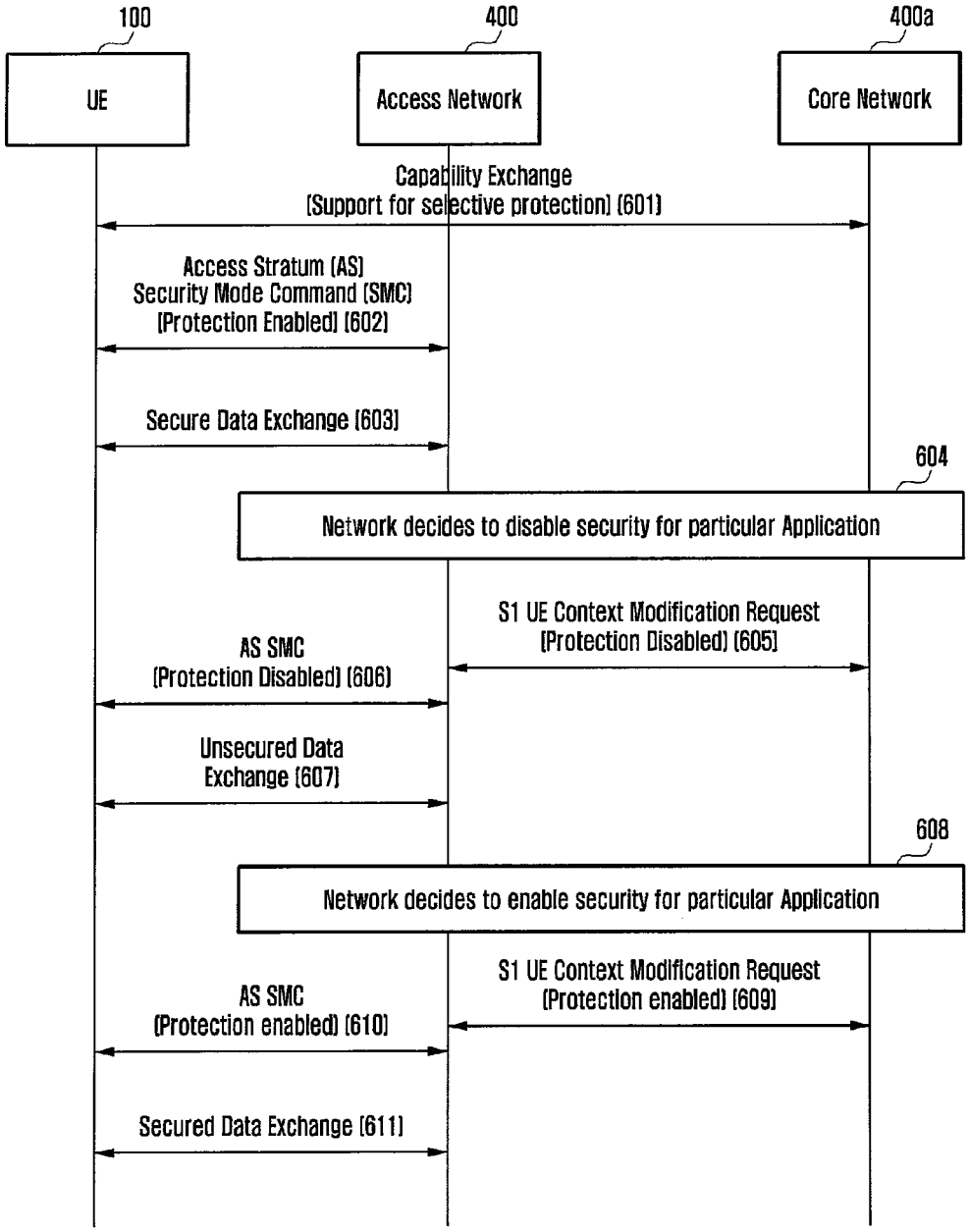
FIG. 6 illustrates the sequence diagram in which the core network decides to apply selective protection for each packet, according to embodiments as disclosed herein.

FIG. 6 illustrates the sequence diagram in which the core network decides to apply selective protection for each packet, according to embodiments as disclosed herein. As depicted in the sequence diagram, the UE 300 and the eNodeB 300a exchanges (601) its capability to support selective protection during the initial attach procedure.

In an embodiment, the selective protection capability is exchanged along with device capability NAS message IE.

The UE 300 initiates the attach procedure by transmitting an attach request to the eNodeB, wherein the attach request comprises the International Mobile Subscriber Identity (IMSI), UE core network capability, UE specific DRX parameters, attach type and so on. Further, the UE 300 sends attach or service request message (L3 message) with the access point name (APN) to the core network 400a through the access network 400. The access point name (APN) can be the default APN also.

The core network 400a receives the L3 message and checks for the validity of the available security context. If the available security context is not valid, then the core network 400a initiates an authentication procedure with the HSS 300f and establishes the security context. Further, the core network 400a enables the encryption for the user plane data based on the operator policy through the SMC and S1-initial context setup procedure.

Further, the access network 400 and UE 300 exchange (602) AS SMC messages for enabling protection. The access network provides (603) secured data exchange to the UE 300.

During the secured data exchange between the UE 300 and the AN 400, the core network 400a decides (604) to disable security for a particular packet of an application running on the UE 300. The decision for enabling or disabling the selective protection for the particular packet of an application is based on operator policy and may be based on the application and/or traffic category and/or load in the core network 400a.

In an embodiment, the decision on the selective protect per packet can be made by the access network 400 also based on the policy of the core network 400a.

When the core network 400a decides for disabling security, then the core network 400a sends (605) an S1-AP message which include a protection disabled indication to the access network 400. Once the access network 400 receives the protection disabled indication from the core network, then the access network 400 initiates the AS SMC procedure with the UE 300 and includes the protection disabled indication.

In an embodiment, after receiving the S1 UE Context modification request or S1-AP: E-RAB Modify Request, the AN 400 initiates at least one of: the AS SMC procedure, RRC Connection reconfiguration, RRC: Radio Modify Setup to disable the security for a particular bearer.

In an embodiment, the core network 400a changes the QCI or to switch the protection for per bearer protection. The SMC exchange includes but not limited to Radio bearer ID, QCI indication for security requirement.

In an embodiment, along with the bearer ID, the network includes the information related to per packet protection (for example, information for statistical manner protection, protocol based protection). So, the UE 300 and the eNB 300a applies the per packet selective protection for the selected bearer ID in statistical manner or based on the protocol.

When the protection is disabled, an unsecured data exchange happens (607) between the UE 300 and the access network 400.

Further, during the unsecured data exchange between the UE 300 and the access network 400, the core network 400a, at any time decides (608) to enable security protection to each packet of an application running on the UE 300. The decision to enable or to disable protection on the particular packet is based on at least one of: operator policy, application, traffic category, and load on the core network 400a, battery power level in the UE and like.

When the core network 400a decides for enabling security, then the core network 400a sends (609) an S1-AP message which includes a protection enabled indication to the access network 400. Once the access network 400 receives the protection enabled indication from the core network 400a, then the access network and the UE 300 exchange (610) AS SMC which includes the protection enabled indication.

In an embodiment, the core network 400a initiates the S1-AP message which can be at least one of: UE Context Modification Request, S1-AP: E-RAB Modify Request to the AN and request AN to enable protection for a particular packet in an application running on UE. The S1-AP message includes at least one of: E-RAB ID, QCI for which the security needs to be enabled.

In an embodiment, after receiving the S1-AP message, the AN 400 initiates at least one of: the RRC procedure, the AS SMC procedure, RRC Connection reconfiguration, RRC: Radio Modify Setup to enable the security for each packet or change the QCI or to switch the protection to per packet protection to enable the security.

Once the security protection is enabled, UE 300 and access network 400 starts (611) secured data exchange for each packet.

Figure 7:
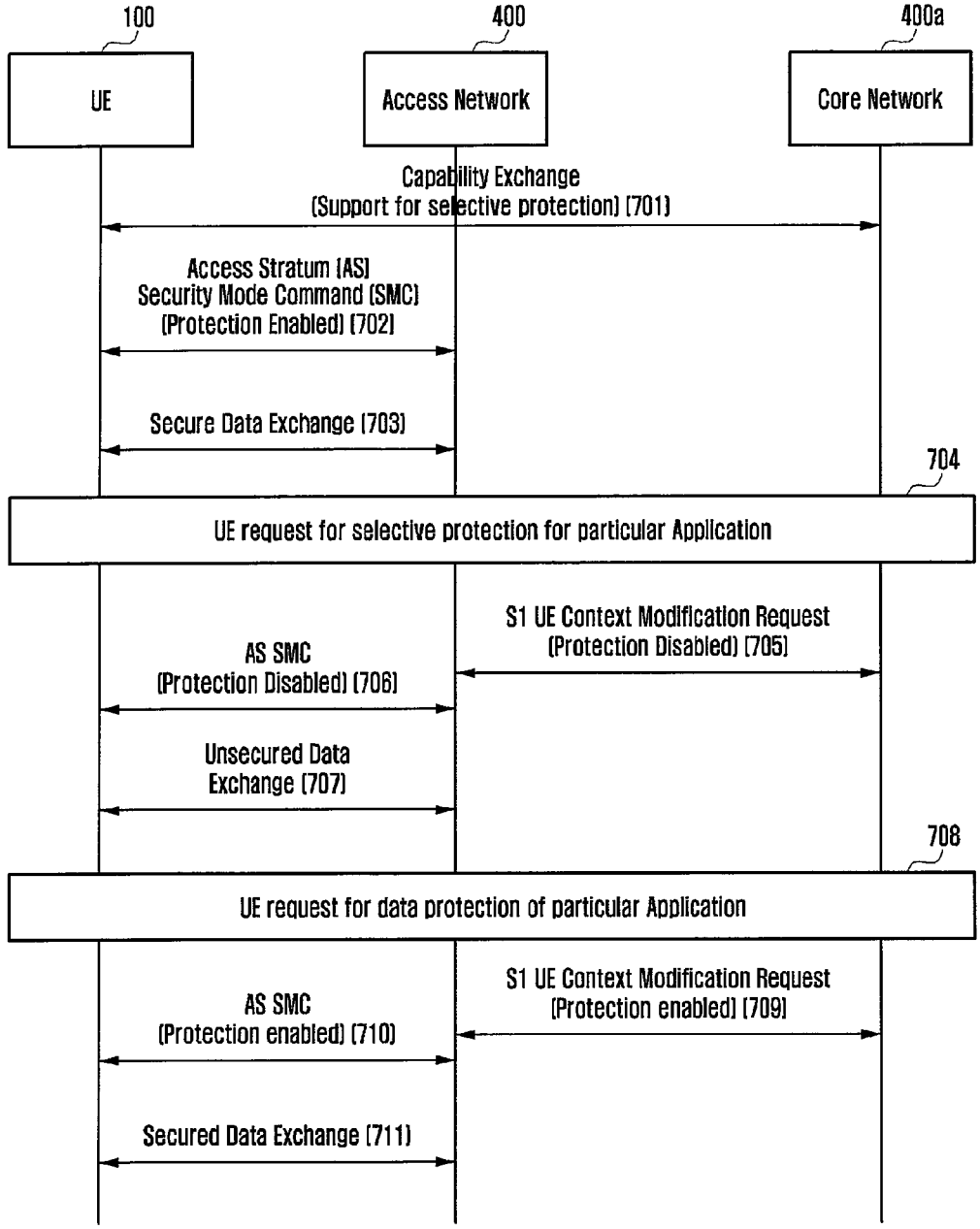
FIG. 7 illustrates the sequence diagram in which the UE requests the core network to apply selective protection for each packet, according to the embodiments as disclosed herein.

FIG. 7 illustrates the sequence diagram in which the UE requests the core network to apply selective protection for each packet, according to the embodiments as disclosed herein. As depicted in the sequence diagram, the UE 300 and the eNodeB 300a exchanges (701) the capability exchange messages for selective protection during the initial attach procedure.

In an embodiment, the selective protection capability is exchanged along with device capability NAS message IE.

The UE 300 initiates the attach procedure by transmitting an attach request to the eNodeB 300a, wherein attach request comprises the IMSI, UE core network capability, UE specific DRX parameters, attach type and the like. Further, the UE 300 sends attach or service request message (L3 message) with the APN to the core network 400a through the access network 400.

The core network 400a receives the L3 message and checks for the validity of the available security context. If the available security context is not valid, then the core network 400a initiates an authentication procedure with the HSS 300f and establishes the security context. Further, the core network 400a enables the encryption for the user plane data based on the operator policy through the SMC and S1-initial context setup procedure.

Once the access network 400 and UE 300 exchange (702) AS SMC protection enabled message, it provides (703) secured data exchange to the UE 300.

During the secured data exchange between the UE 300 and the AN 400, the UE 300 decides (704) to request for a selective protection of each packet of an application running in the UE, to the core network 400a.

In an embodiment, the UE 300 requests for selective protection using a new NAS message or existing NAS message.

In an embodiment, the decision for enabling or disabling the selective protection is requested by the UE 300 for a particular packet of an application may be based on the type of application and/or battery power availability of the UE 300 and the like.

When the UE 300 requests for selective protection of each packet of an application, then the core network 400a sends (705) an S1 UE context modification request which includes a protection disabled indication to the access network 400. Once the access network 400 receives the protection disabled indication from the core network, then the access network and the UE exchange (706) an AS SMC which includes the protection disabled indication.

In an embodiment, after receiving the S1-AP: Context modification request or S1-AP: E-RAB Modify Request, the AN 400 initiates at least one of: AS SMC procedure, RRC connection reconfiguration, RRC: Radio Modify Setup to disable the security for a particular bearer.

When the protection is disabled, between the UE 300 and the access network 400 starts (707) an unsecured data exchange.

Further, during the unsecured data exchange between the UE 300 and the access network 400, the UE 300, at any time requests (708) for data protection to each packet of the application running on the UE 300.

In an embodiment, the UE 300 requests for selective protection using a new NAS message or existing NAS message.

In an embodiment, the decision to enable or to disable protection on a particular packet is requested by the UE 300 for a particular packet of an application is based on the type of application and/or battery power availability of the UE 300 and the like.

When the UE 300 requests for enabling security, then the core network 400a sends (709) an S1 UE context modification request which include a protection enabled indication to the access network 400. Once the access network 400 receives the protection enabled indication from the core network 400a, then the access network 400 and the UE 300 exchange (710) AS SMC messages which includes the protection enabled indication.

In an embodiment, the core network 400a initiates the S1 UE Context Modification Request or S1-AP: E-RAB Modify Request to the AN and request AN to enable protection for a particular packet in an application running on UE. The S1 UE Context Modification Request or S1-AP: E-RAB Modify Request includes the E-RAB ID and/or QCI for which the security needs to be enabled.

When the security protection is enabled for each packet, UE 300 and access network 400 starts (711) secured data exchange.

Figure 8:
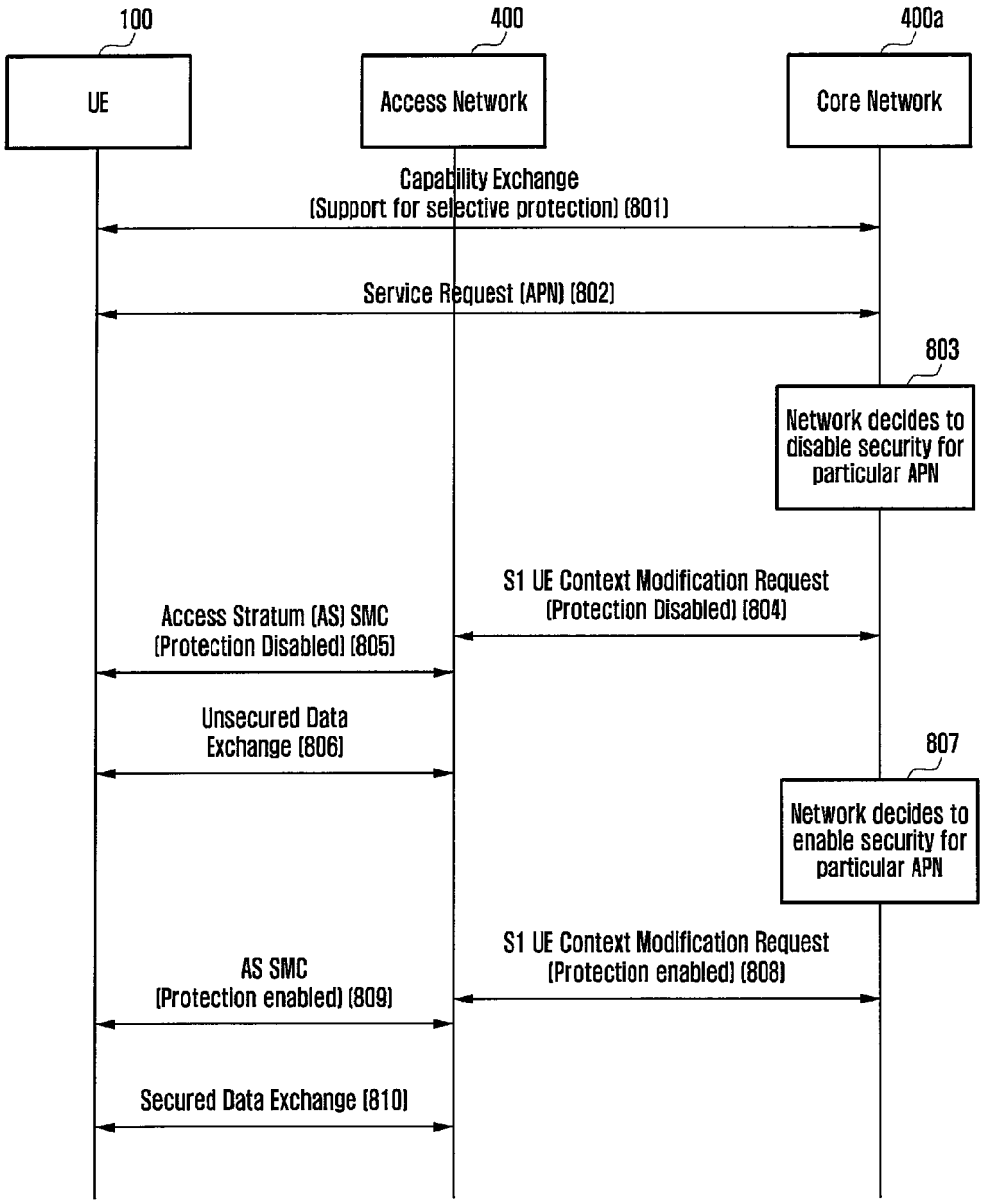
FIG. 8 illustrates the sequence diagram in which the core network decides to apply selective protection to each access point name (APN), according to the embodiments as disclosed herein.

FIG. 8 illustrates the sequence diagram in which the core network decides to apply selective protection to each access point name (APN), according to the embodiments as disclosed herein. Initially, the UE 300 and the core network 400a exchanges (801) its capability to support "selective protection" during initial attach procedure. The "selective protection" capability is exchanged along with UE 300 capability NAS message IE. Then the UE 300 sends (802) attach/service request message with APN or for default APN to the MME 300b through the eNodeB 300a. Then the core network 400a retrieves the security context. If the context is not available, then the core network 400a initiates the authentication procedure.

Further, the core network 400a decides (803) to perform selective protection and decides to disable the protection for this particular APN. The decision to whether to enable or to disable protection on a particular APN is based on operator policy and may be based on the security level decided for the APN (like video streaming (video streaming)) and/or traffic category and/or load on the core network 400a.

Further, the core network 400a initiates (804) the S1 Initial Context Setup Request to the access network 400 and request access network 400 to disable uplink protection for this particular PDN connection. In an embodiment, the S1 Initial Context Setup Request includes but not limited to the S1-TEID and/or EPS bearer ID assigned for this particular APN for which the security needs to be disabled.

After receiving the S1 Initial Context Setup Request, the access network 400 either applies per bearer protection or per packet selective protection as described in FIG. 3. Then access network initiates (805) the AS SMC procedure for disabling security for this particular PDN connection and also eNodeB 300a includes the decision on whether approach or per packet based approach to be used. In an embodiment, the SMC exchange includes the Radio bearer ID. The eNodeB 300a identifies the RAB-ID, to disable the security using the S1-TEID.

Further, the UE 300 and access network 400 starts (806) the uplink unsecured data exchange without any protection for this particular APN. During the unsecured data exchange, the core network 400a decided to perform selective protection and decides (807) to enable protection for this particular APN. Then the core network 400a initiates (808) the S1 UE Context Modification Request to the access network 400 and request access network 400 to enable protection for the particular PDN connection. The S1 UE 300 Context Modification Request includes but not limited to the S1-TEID and/or EPS bearer ID for which the security needs to be enabled. The eNB 300a identifies the RAB-ID, to enable the security using the S1-TEID. After receiving the S1 UE 300 Context Modification Request, the access network 400 initiates (809) the AS SMC procedure to enable the security for this particular APN. The SMC exchange includes but not limited to the Radio bearer ID (RAB-ID). In an embodiment, along with the bearer ID, the access network 400 includes the information related to per packet protection in statistical manner. So, the UE 300 and the eNB 300a applies the per packet selective protection for the selected bearer ID in statistical manner. Further, the UE 300 and access network 400 starts (810) the uplink secured data exchange with protection for that particular APN.

Figure 9:
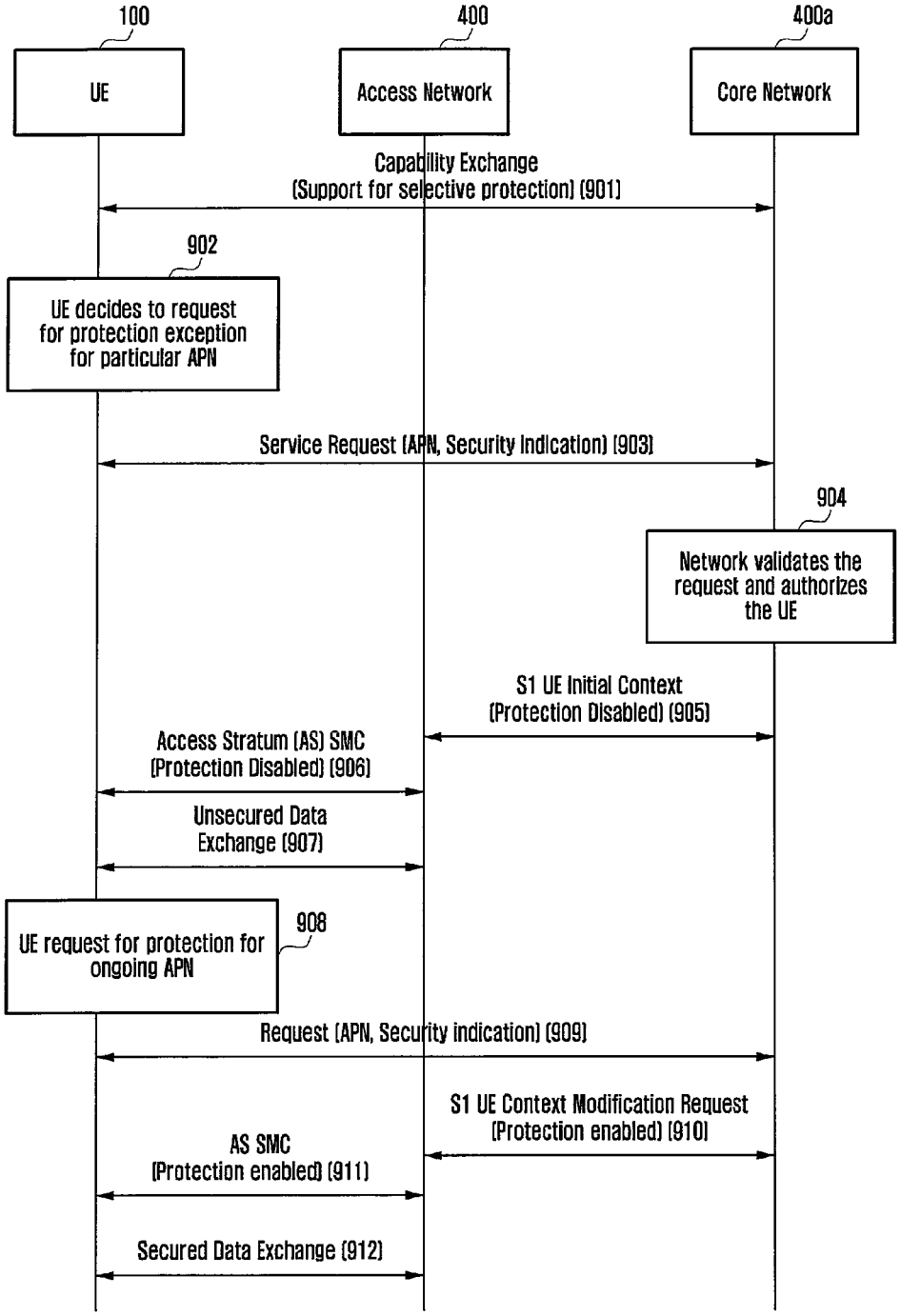
FIG. 9 illustrates a sequence diagram in which the UE requests the core network to apply selective protection to each APN, according to the embodiments as disclosed herein.

FIG. 9 illustrates the sequence diagram in which the UE requests the core network to apply selective protection for each APN, according to embodiments as disclosed herein. Initially, the UE 300 and the core network 400a exchanges (901) its capability to support "selective protection" during initial attach procedure. The "selective protection" capability is exchanged along with UE 300 capability NAS message IE. Then the UE 300 decides (902) to request for protection exception for a particular APN (to disable the protection).

In an embodiment, the decision to request for enable or to disable protection on a particular APN is based on operator policy, user configuration, application category, traffic category and battery power availability in the UE 300. In an embodiment, the UE 300 requests for selective protection using a new NAS message or using existing NAS message.

Further the UE 300 sends (903) attach/service request message with APN or for default APN to the MME 300b through the eNB 300a. Then the core network 400a retrieves the security context. If the context is not available, then the core network 400a initiates the authentication procedure. After successful authentication or context retrieval, the core network 400a enables the encryption for the user plane data based on the operator policy through the SMC and S1 (Initial Context Setup) procedure.

The core network 400a then validates (904) the request and authorizes the service request immediately. Also, the core network 400a initiates (905) the S1 UE 300 Context Modification Request to the access network 400 and request access network 400 to disable protection for a particular APN. The S1 UE 300 Context Modification Request includes the S1-TEID and/or EPS bearer ID for which the security needs to be disabled. After receiving the S1 UE 300 Context Modification Request, the access network 400 initiates (906) the AS SMC procedure to disable the security for a particular APN. The SMC exchange includes but not limited to the Radio bearer ID. The eNB 300a identifies the RAB-ID, to disable the security using the S1-TEID.

The UE 300 and the access network 400 starts (907) the uplink unsecured data exchange without any protection for that particular APN. During the unsecured data exchange, the UE 300 decides to request (908) selective protection for ongoing APN (to enable the protection).

In an embodiment, the decision to request enable or to disable protection on the ongoing APN is based on operator policy, user configuration, application category, and traffic category and battery power availability in the UE 300. In an embodiment, the UE 300 requests for selective protection using a new NAS message or using existing NAS message.

Further the UE 300 requests (909) the core network 400a for ongoing APN. The core network 400a then initiates (910) the S1 UE 300 Context Modification Request to the access network 400 and request access network 400 to enable protection for a particular APN. The S1 UE 300 Context Modification Request includes but not limited to the S1-TEID and/or EPS bearer ID for which the security needs to be enabled. The eNodeB 300a identifies the RAB-ID, to enable the security using the S1-TEID.

After receiving the S1 UE 300 Context Modification Request, the access network 300 initiates (911) the AS SMC procedure to enable the security for a particular APN. The SMC exchange includes the bearer ID.

The UE 300 and access network 400 starts (912) the uplink secured data exchange with protection for that particular APN.

Figure 10:
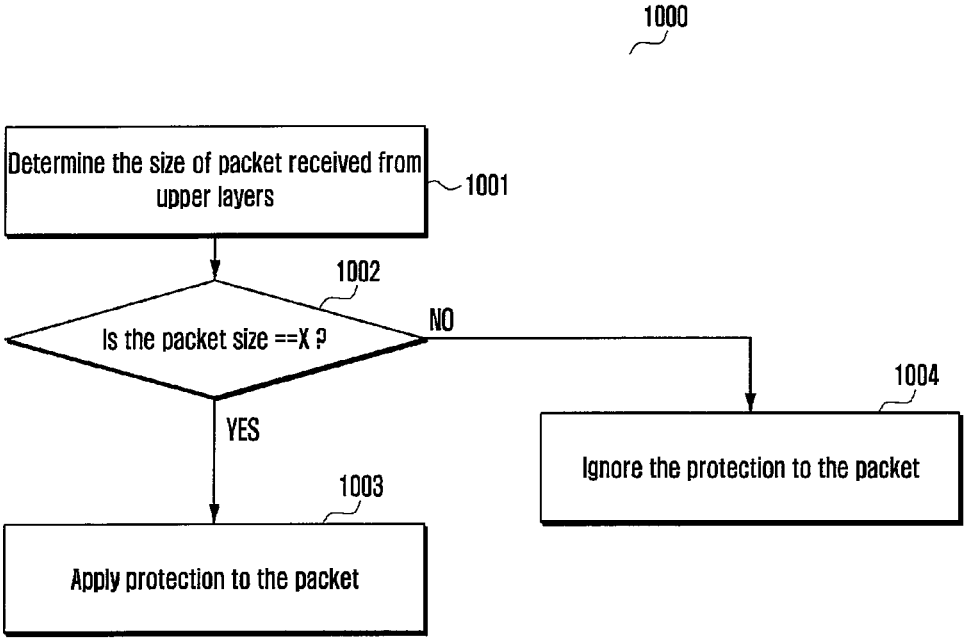
FIG. 10 illustrates a flow diagram explaining the process of determining selective protection for packet of a bearer based on the size of the packet in transmitting device side operation, according to the embodiments as disclosed herein.

FIG. 10 illustrates a flow diagram explaining the process of determining selective protection for packet of a bearer based on the size of the packet in transmitting device side operation, according to the embodiments as disclosed herein. In an embodiment, the selective protection mechanism can be applied based on the size of the packet. In general, different type of packets can have different sizes. For example, for a bearer carrying VOIP packets, two types of packets are transmitted. The first type consists of active voice packets having size 'x' where x depends on codec, IP version and IP header compression scheme that is used. The second type consists of silence packets having size 'y' where 'y' depends on codec, IP version and IP header compression scheme that is used. For AMR codec, the raw active voice packet size is 33 bytes whereas raw silence packet size is 7 bytes. Considering overhead of RTP+UDP+IP active voice packet size is 73 bytes for IPV4 and 93 bytes for IPV6. Considering overhead of RTP+UDP+IP silence voice packet size is 47 bytes for IPV4 and 67 bytes for IPV6.

In an embodiment, the transmitting device decides to protect or unprotect the packet based on size of packet for a bearer. As depicted in the flow diagram 1000, initially the transmitting device determines (1001) the size of the packet received from the upper layers. Further, the transmitting device determines (1002) the size of the packet received from upper layers. For example in case of VOIP, if the packet size received from upper layers by PDCP is equal to 'X' then the transmitting device applies (1003) protection for that packet, otherwise the transmitting device ignores (1004) the protection for that packet. The various actions in flow diagram 1000 may be performed in the order presented, in a different order or simultaneously. Further, in some embodiments, some actions listed in FIG. 10 may be omitted.

In an embodiment, the selective protection mechanism described herein can also be applied based on the protocol used for the communication (data exchange) between UE 300 and the wireless network.

The wireless network (comprising access network and core network) can decide for enabling or disabling the selective protection to the data exchange between the wireless network and the UE 300 based on the type of protocol used for communication.

In an example, the core network can either enable protection for a transmission control protocol (TCP) and at time, the core network can disable the protection for the user datagram protocol (UDP).

In an embodiment, the core network 400a can decide to enable or disable the protection for selective packets in selected protocols used for communication between UE 300 and the wireless network.

In an example, the core network 400a can enable or disable the protection for Real-time Transport Protocol (RTP), whereas the core network 400a can enable protection for selected packets in Real-time Transport Protocol (Real-time Transport Control Protocol (RTCP)). In this way, the core network 400a can decide for either enabling or disabling the protection based on the size of packets, the type of protocol used for the communication and selected packets in a particular protocol used for the communication.

Figure 11:
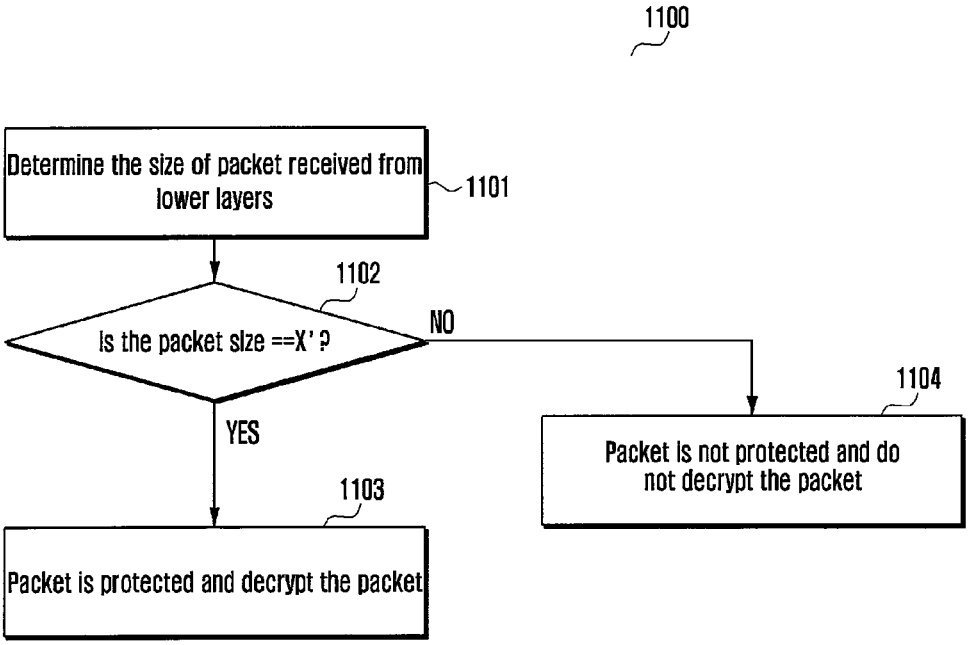
FIG. 11 illustrates the flow diagram explaining the process of determining selective protection for packet of a bearer based on the size of the packet in receiving device side operation, according to the embodiments as disclosed herein.

FIG. 11 illustrates the flow diagram explaining the process of determining selective protection for packet of a bearer based on the size of the packet in receiving device side operation, according to the embodiments as disclosed herein. In an example, consider 'x' and 'y' are the sizes of active voice packet and silence voice packet respectively such that x>y (active voice packet size is greater than silence voice packet size). Initially, the receiving device determines (1101) the size of the packet received from the lower layers. In the receiving device side, the PDCP determines (1102) whether the size of packet is X'=X+size of PDCP header+size of security headers. If the packet size is equal to X', then the receiving device decrypts (1103) the packet otherwise the packet will not be decrypted (1104). Further, this method does not require any security bit in the PDCP header to determine whether packet is encrypted or not encrypted. The various actions in flow diagram 1100 may be performed in the order presented, in a different order or simultaneously. Further, in some embodiments, some actions listed in FIG. 11 may be omitted.

Figure 12:
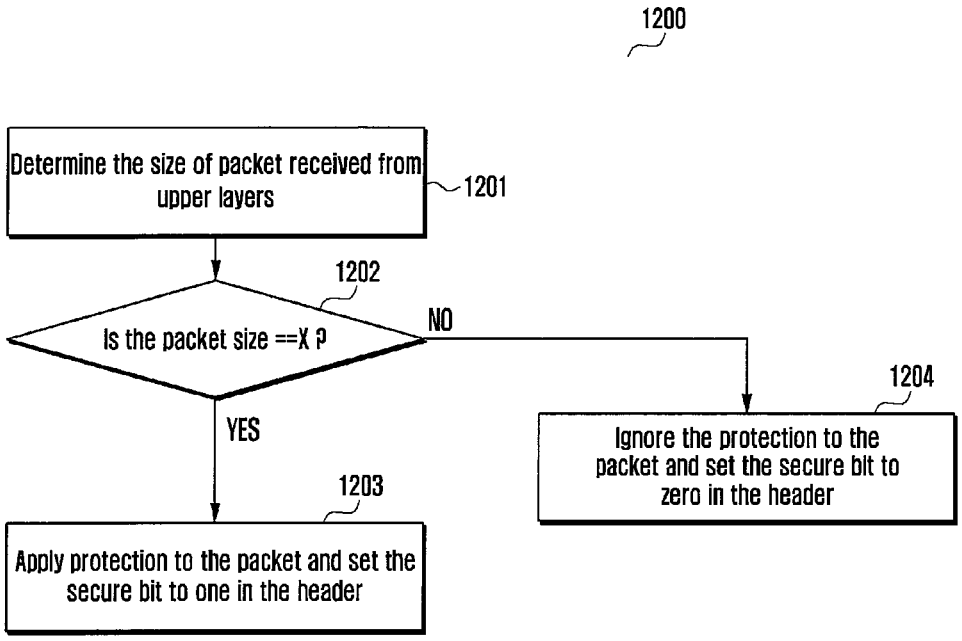
FIG. 12 illustrates the flow diagram explaining the process of determining selective protection for packet of a bearer in transmitting device side operation using a secure bit field, according to embodiments as disclosed herein.

FIG. 12 illustrates the flow diagram explaining the process of determining selective protection for packet of a bearer in transmitting device side operation using a secure bit field, according to embodiments as disclosed herein. As depicted in the flow diagram 1200, initially the transmitting device determines (1201) the size of the packet received from the upper layers. For example in case of VOIP, the transmitting device determines (1202) whether the packet size received from upper layers by PDCP is equal to 'X' then protection is applied (1203) for that packet at step otherwise the protection is not applied (1204) for that packet and initializes the secure (Sec) bit to zero in the header.

If the security bit is defined in the PDCP header then transmitting device after applying protection sets the security bit to one in the PDCP header. Further, if the protection is not applied on the packet based on the packet size, then the security bit is set to zero in the PDCP header. The various actions in flow diagram 1200 may be performed in the order presented, in a different order or simultaneously. Further, in some embodiments, some actions listed in FIG. 12 may be omitted.

Figure 13:
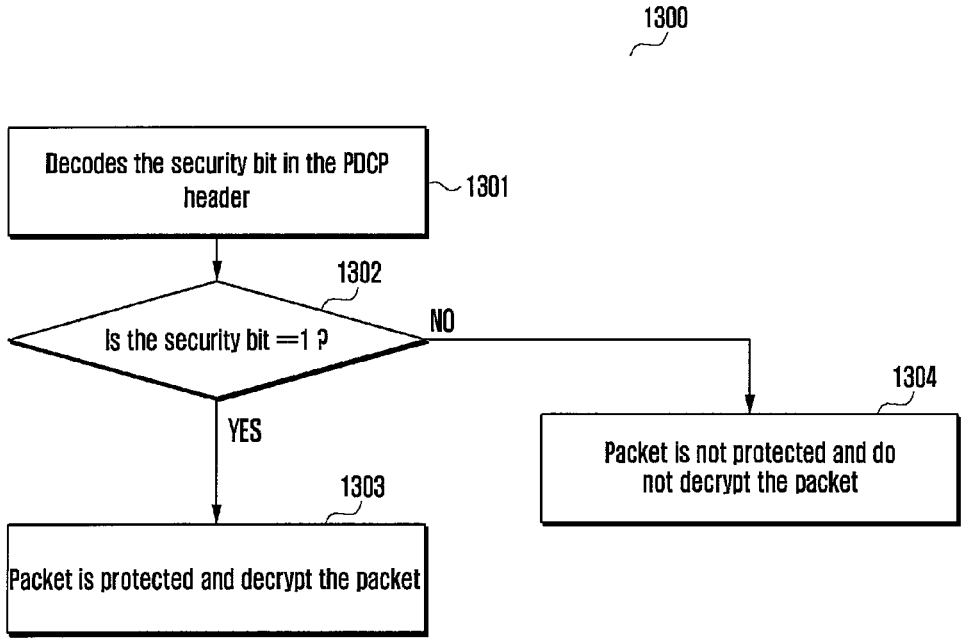
FIG. 13 illustrates the flow diagram explaining the process of determining selective protection for packet of a bearer in receiving device side operation using a secure bit field, according to embodiments as disclosed herein.

FIG. 13 illustrates the flow diagram explaining the process of determining selective protection for packet of a bearer in receiving device side operation using a secure bit field, according to embodiments as disclosed herein. In the receiving device side, as depicted in flow diagram 1300, initially the receiving device decodes (1301) the security bit in the PDCP header and the PDCP layer checks (1302) only the security bit to determine whether packet is encrypted or not. If the security bit is equal to one, then the receiving device assumes that the packet protection is applied and hence the receiving device decrypts (1303) the packet. If the security bit is not equal to one then the receiving device assumes that the packet protection is not applied and hence the packet will not be decrypted (1304) by the receiving device.

Further, the receiving device does not have to check the size of received packet to determine whether the packet is encrypted or not when the security bit field is set to either zero or one in the PDCP header. The various actions in flow diagram 1300 may be performed in the order presented, in a different order or simultaneously. Further, in some embodiments, some actions listed in FIG. 13 may be omitted.

FIG. 14 illustrates a computing environment for implementing the method and system for enabling and disabling the selective protection by the wireless network, according to the embodiments as disclosed herein. As depicted the computing environment 1401 comprises at least one processing unit 1404 that is equipped with a control unit 1402 and an Arithmetic Logic Unit (ALU) 1403, a memory 1405, a storage unit 1406, plurality of networking devices 1408 and a plurality Input output (I/O) devices 1407. The processing unit 1404 is responsible for processing the instructions of the algorithm. The processing unit 1404 receives commands from the control unit in order to perform its processing. Further, any logical and arithmetic operations involved in the execution of the instructions are computed with the help of the ALU 1403.

The overall computing environment 1401 can be composed of multiple homogeneous and/or heterogeneous cores, multiple CPUs of different kinds, special media and other accelerators. The processing unit 1404 is responsible for processing the instructions of the algorithm. Further, the plurality of processing units 1404 may be located on a single chip or over multiple chips.

The algorithm comprising of instructions and codes required for the implementation are stored in either the memory unit 1405 or the storage 1406 or both. At the time of execution, the instructions may be fetched from the corresponding memory 1405 and/or storage 1406, and executed by the processing unit 1404.

In case of any hardware implementations various networking devices 1408 or external I/O devices 1407 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 and 14 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

[1. A method for a network node, the method comprising:

receiving a message including an access point name (APN) from a terminal;

identifying whether the terminal supports a selective protection mechanism;

determining whether to perform the selective protection for at least one packet associated with at least one bearer corresponding to the APN included in the received message, if the terminal supports the selecting protection mechanism; and applying the selective protection to the at least one packet associated with at least one bearer, if to perform the selective protection is determined.]

[2. The method as in claim 1, wherein the applying the selective protection further comprises:

applying the selective protection to at least one of a packet, a bearer, and the access point name (APN).]

[3. The method as in claim 1, wherein the identifying further comprises:

receiving an indication for indicating a terminal capability corresponding to the selective protection from the terminal; and determining the terminal supports the selective protection mechanism if the indication is received from the terminal.]

[4. The method as in claim 1, wherein the applying the selective protection further comprises:

applying the selective protection to the at least one bearer; and providing an indication indicating whether the bearer is secured or unsecured with other network node, wherein the at least one bearer is associated with at least one of a quality of service QoS class identifier (QCI), a secured or a non-secured indication, and an Allocation and Retention Priority (ARP).]

[5. The method as in claim 1, wherein the applying the selective protection further comprises:

applying the selective protection to the at least one packet associated with the at least one bearer corresponding to a type of application running on the terminal, wherein the selective protection is indicated in a reserved bit, and wherein the reserved bit is set to one if the protection is enabled on the packet associated with the at least one bearer.]

[6. The method as in claim 2, wherein the applying the selective protection further comprises:

applying the selective protection to the at least one the APN, upon receiving a service request from the terminal, wherein the service request from the terminal comprises the at least one APN, and wherein the applying the selective protection to the APN, if the message is a service request message which includes the APN and a security indication.]

[7. A network node, the network node comprising a transceiver configured to receive a message including an access point name (APN) from a terminal; and a controller configured to:

identify whether the terminal supports a selective protection mechanism;

determine whether to perform the selective protection for at least one packet associated with at least one bearer corresponding to the APN included in the received message if the terminal supports the selecting protection mechanism; and apply the selective protection to the at least one packet associated with at least one bearer if whether to perform the selective protection is determined.]

[8. The network as in claim 7, wherein the controller is configured to apply the selective protection to at least one of a packet, a bearer, and the access point name (APN).]

[9. The network as in claim 7, wherein the controller is configured to control the transceiver for receiving an indication for indicating a terminal capability corresponding to the selective protection from the terminal, and determine the terminal supports the selective protection mechanism if the indication is received from the terminal.]

[10. The network as in claim 7, wherein the controller is configured to apply the selective protection to the at least one bearer and to provide an indication indicating whether the bearer is secured or unsecured with other network node, wherein the at least one bearer is associated with at least one of a quality of service QoS class identifier (QCI), a secured or a non-secured indication, and an Allocation and Retention Priority (ARP).]

[11. The network as in claim 8, wherein the controller is configured to apply the selective protection to the at least one packet associated with the at least one bearer corresponding to a type of application running on the terminal, wherein the selective protection is indicated in a reserved bit, and wherein the reserved bit is set to one if the protection is enabled on the packet associated with the at least one bearer.]

[12. A terminal for selective protection of data, wherein the data is exchanged with a wireless network, terminal comprising:

a transceiver; and a controller configured to:

control the transceiver for transmitting a message including an access point name (APN) to a network node;

apply the selective protection to the at least one packet associated with the at least one bearer to the network node if the terminal support a selection protection mechanism;

perform the selective protection for at least one packet associated with at least one bearer corresponding to the APN included in the received message is determined by the network node.]

[13. The terminal as in claim 12, wherein the controller is configured to control the transceiver for transmitting the message including the APN based on at least one comprises: a type of application running on the terminal, a battery power availability of the terminal, a configuration of the terminal.]

[14. The terminal as in claim 12, wherein the controller is configured to control the transceiver for transmitting the message including the APN using at least one of an existing non-access stratum (NAS), an existing access stratum (AS) message, a new NAS message and a new AS message.]

[15. The terminal as in claim 12, wherein the controller is configured to control the transceiver for transmitting the message including the APN corresponding to the type of application running on the terminal.]

[16. The method as in claim 1, wherein the applying the selective protection further comprises:

applying the selective protection to the at least one packet associated with at least one bearer based on at least a type of application running on the UE, a battery power availability of the UE, a load in the network, a configuration of the UE, and a configuration of the network.]

[17. The method as in claim 1, wherein the selective protection is applied based on at least one of a packet size, an application protocol, and transport layer protocol.]

[18. The network as in claim 7, wherein the controller is configured to apply the selective protection based on at least one of a packet size, an application protocol, and transport layer protocol.]

[19. The method as in claim 2, wherein bearer comprises an indication indicating whether the bearer is to be protected.]

[20. The network as in claim 8, wherein bearer comprises an indication indicating whether the bearer is to be protected.]

*21. A method performed by a network entity in a communication system, the method comprising:*

*receiving, from a terminal, a message including an access point name (APN);*

*identifying whether a selective protection is applied to a user plane data of the terminal based on the APN included in the message; and*

*in response to identifying that the selective protection is applied to the user plane data of the terminal, transmitting, to a base station, information for applying the selective protection to the user plane data.*

*22. The method of claim 21, wherein the selective protection is applied to the user plane data for a data radio bearer (DRB) of the terminal.*

*23. The method of claim 21, wherein the selective protection is associated with a confidentiality protection for the user plane data.*

*24. The method of claim 21, wherein terminal capability information associated with the selective protection is received from the terminal, and wherein whether the selective protection is applied to the user plane data of the terminal is identified based on the APN and the terminal capability information.*

*25. The method of claim 21, wherein the information for applying the selective protection is included in an initial context setup request message.*

*26. A method performed by a base station in a communication system, the method comprising:*

*transmitting, to a network entity, a message including an access point name (APN);*

*receiving, from the network entity, information for applying a selective protection to a user plane data, based on the selective protection being applied to the user plane data of a terminal; and*

*performing the selective protection for the user plane data associated with a data radio bearer (DRB) of the terminal based on the information.*

*27. The method of claim 26, wherein the selective protection is associated with a confidentiality protection for the user plane data.*

*28. The method of claim 26, wherein the information for applying the selective protection is included in an initial context setup request message.*

*29. A network entity in a communication system, the network entity comprising:*

*a transceiver; and*

*a processor coupled with the transceiver and configured to control to: receive, from a terminal, a message including an access point name (APN),*

*identify whether a selective protection is applied to a user plane data of the terminal based on the APN included in the message, and*

*in response to identifying that the selective protection is applied to the user plane data of the terminal, transmit, to a base station, information for applying the selective protection to the user plane data.*

*30. The network entity of claim 29, wherein the selective protection is applied to the user plane data for a data radio bearer (DRB) of the terminal.*

*31. The network entity of claim 29, wherein the selective protection is associated with a confidentiality protection for the user plane data.*

*32. The network entity of claim 29, wherein terminal capability information associated with the selective protection is received from the terminal, and wherein whether the selective protection is applied to the user plane data of the terminal is identified based on the APN and the terminal capability information.*

*33. The network entity of claim 29, wherein the information for applying the selective protection is included in an initial context setup request message.*

*34. A base station in a communication system, the base station comprising:*

*a transceiver; and*

*a processor coupled with the transceiver and configured to control to: transmit, to a network entity, a message including an access point name (APN),*

*receive, from the network entity, information for applying a selective protection to a user plane data, based on the selective protection being applied to the user plane data of a terminal, and*

*perform the selective protection for the user plane data associated with a data radio bearer (DRB) of the terminal based on the information.*

*35. The base station of claim 34, wherein the selective protection is associated with a confidentiality protection for the user plane data.*

*36. The base station of claim 34, wherein the information for applying the selective protection is included in an initial context setup request message.*

* * * * *